United States Patent [19]
Wong

[11] 4,047,144
[45] Sept. 6, 1977

[54] TRANSDUCER

[75] Inventor: Herbert Vernon Wong, San Francisco, Calif.

[73] Assignee: Becton, Dickinson Electronics Company, San Juan Capistrano, Calif.

[21] Appl. No.: 605,120

[22] Filed: Aug. 15, 1975

Related U.S. Application Data

[63] Continuation of Ser. No. 158,618, June 30, 1971, abandoned, which is a continuation of Ser. No. 802,595, Feb. 26, 1969, abandoned.

[51] Int. Cl.² .............................................. G01L 1/22
[52] U.S. Cl. .................................. 338/2; 73/88.5 SD; 338/6; 357/26
[58] Field of Search ...................... 338/2, 5, 6; 357/26; 73/88.5 SD; 29/583, 591

[56] References Cited
U.S. PATENT DOCUMENTS

| | | | |
|---|---|---|---|
| 3,351,880 | 11/1967 | Wilner | 338/6 |
| 3,392,358 | 7/1968 | Collins | 338/2 |
| 3,492,513 | 1/1970 | Hollander, Jr. | 73/88.5 SD |

Primary Examiner—C. L. Albritton
Attorney, Agent, or Firm—Reed C. Lawlor

[57] ABSTRACT

An electromechanical transducer is provided which employs a piezoresistive substrate support body of semiconductive material of which a first type N or P and a lineal resistor composed of material of a second type (P or N) formed on one surface thereof. The support body has a reduced neck intermediate two pads. The lineal resistor extends between the pads and across the neck on one side of the support body. The lineal resistor is formed by diffusing semiconductive material of the second type of conductivity into the substrate material. Strain is detected by measuring the change in resistance of the lineal resistor. When the transducer is subjected to strain, the resistance changes by an amount depending on the strain. While the electrical current flows through the resistor, heat developed in the resistors flows into the neck and then is conducted through the flaring portions of the neck to the pads and then to an object under test.

13 Claims, 7 Drawing Figures

INVENTOR
HERBERT VERNON WONG
BY
ATTORNEY

INVENTOR
HERBERT VERNON WONG
BY
ATTORNEY

TRANSDUCER

This is a continuation of application Ser. No. 158,618, filed June 30, 1971 and now abandoned, which is a continuation of application Ser. No. 802,595 filed Feb. 26, 1969 and now abandoned.

CROSS REFERENCES TO RELATED APPLICATIONS

Patent Application Serial No. 421,869, Filed December 29, 1964, now Patent No. 3,501,732.

FIELD OF THE INVENTION

This invention relates to electromechanical transducers for converting mechanical displacement forces, or other physical phenomena into electrical signals and more particularly to an improved strain sensitive element employing semiconductive material for use therein.

PRIOR ART

In many electromechanical transducers which are commonly employed, whether they be employed for measuring acceleration, velocity, pressure, or simply the relative displacement of two mechanical parts or the strain in a single mechanical part, the transducing element is utilized for detecting the relative displacement of two parts and for developing a corresponding electric signal. Such relative displacement has heretofore been measured with various kinds of strain gauges, some of which are of considerable weight, some of which are bulky, some of which are not very sensitive, and some of which are very expensive. Some of the strain gauge elements which have heretofore been employed as part of the transducers have been of the resistance type. Such strain gauge elements change electrical resistance when subjected to strain. Commonly, a resistance strain gauge is made of metal wire. Others have employed piezoresistive semiconductive materials.

The use of piezoresistive semiconductive strain gauges in place of metal wire strain gauges has the advantage that the change in resistance produced by the strain in the element is greater than it would be if the element were composed of metal such as platinum, nichrome, or constantan. In metal the change in resistance is due almost entirely to the change in length and cross-sectional area while maintaining a constant specific electrical resistivity. In piezoresistive semiconductive materials, however, a much larger change in resistance is experienced.

As used in this specification, the term strain gauge element refers to an element which is employed to measure displacement, forces or other physical phenomena which produce strain in the element. Such strain is associated with the stress that occurs in the element concurrently with the strain. In practice, a strain gauge element is often connected between two parts of an object undergoing test and it is stressed and strained in an amount which depends upon the displacement of the parts.

SUMMARY OF THE INVENTION

In the present invention, a piezoresistive substrate support body of semiconductive material is formed with a reduced neck interconnecting two pads which are larger than the neck and which are provided with relatively larger surfaces to provide relatively large areas for bonding the substrate support body to two relatively movable parts. A body which may be used as a support is described, for example, in Wilner, U.S. Pat. No. 3,351,880. The neck is not only reduced in transverse dimensions as compared with the pads, but, in the best embodiment of the invention, the neck is very short and has a length that is less than the length of each of the pads. Furthermore, the reduced portion may be of an hour-glass configuration, that is, its cross-section is a minimum at some portion between the pads such as at its center and the cross-section gradually increases in each direction from the center as the pads are approached. In the best embodiment of the invention, one surface of the neck is in the same plane as the surfaces of the two pads on one side of the support body, thus forming a neck of hour-glass shape but which is flat on one side.

In order to form the strain gauge element which is the subject of this invention, impurities are introduced, such as by diffusion, into the semiconductive substrate support body across the neck in a desired geometric configuration. The diffusion process produces a line of semiconductive material in the support body which is of a different conductivity type than the remainder of the semiconductive support body. This line of material forms a lineal resistor in one face of the support body.

For simplicity of explanation, this invention will be described with reference to an embodiment wherein the substrate support body is of N-type, semiconductive silicon material, and the doping material, the impurity, introduced into the support body is boron.

In the best embodiment of the invention, doping of the silicon support body takes the geometric form of a U-shaped pattern. The active or high resistance part, that is the two legs of the U, extends across the region of the neck of the substrate support body. These two legs together constitute a lineal resistor. This placement and shape of the pattern positions the lineal resistor on the neck of the support body, the region of greatest strain concentration. By employing such a U-shaped resistor, the strain gauge unit has the advantage of ease of installation and terminal connection due to the fact that both terminals of the lineal resistor lie on the same pad of the substrate support body. It will be understood, however, that this invention may be embodied in many other geometrical shapes in which the lineal resistor lies on or across the neck of the substrate support body.

A semiconductive strain gauge unit constructed in accordance with this invention may be used to measure the relative displacement between the pads when they are bonded to the object undergoing tests. Such measurements are effected by determining the change in resistance of the lineal resistance as the neck of the support body undergoes compression and extension. In some forms of the invention, one side of the neck and the surfaces on that side of the pads are coplanar, and the lineal resistor is formed on that side of the neck. This form of the invention is particularly advantageous to use where the displacement results in a bending of the neck. In this form of the invention, a change in the resistance results from such bending of the strain gauge unit.

In one method of practicing the invention, this change in resistance is determined by measuring changes in voltage across the resistance while a constant current is flowing through the lineal resistor. In another, the change in resistance is determined by measuring changes in current while the voltage across the lineal resistor is constant.

Electrical terminals are formed at the ends of the lineal resistor in order to facilitate connection of the strain gauge element to a measuring circuit. Use of a U-shaped configuration for the doped line allows both electrical terminals to be formed close together on one pad. Electrical leads are bonded to these terminals.

The foregoing and other features and advantages of the invention, together with various features thereof, will be understood more fully from the following specification taken in conjunction with the accompanying drawings wherein.

Figure 1:
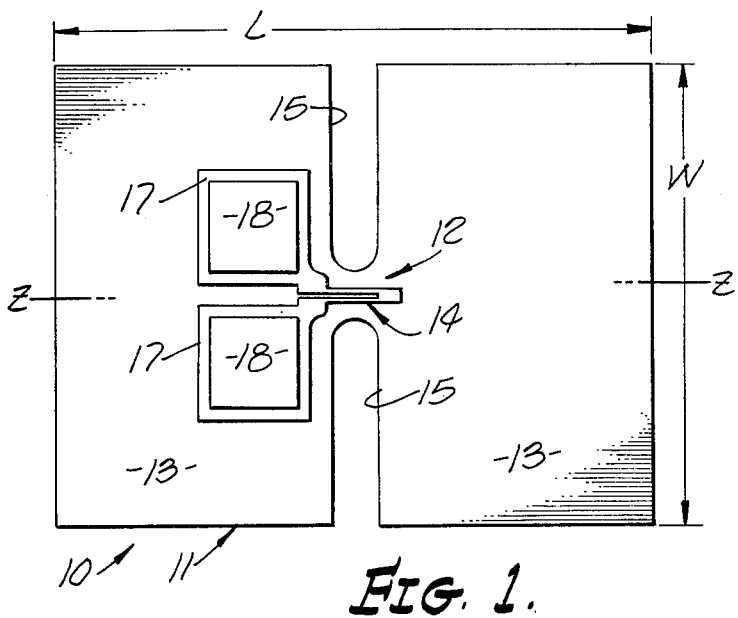
FIG. 1 is a top plan view of a strain gauge unit embodying this invention.
Figure 2:
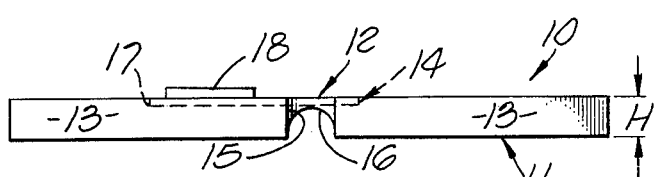
FIG. 2 is an elevational view of a strain gauge unit embodying this invention.
Figure 5:
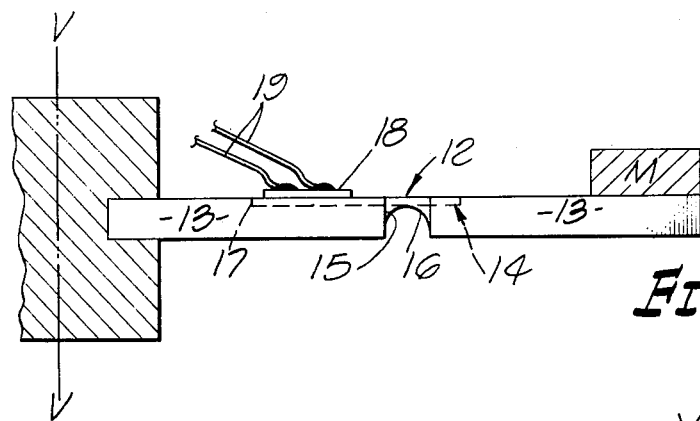
FIG. 5 is an elevational view of a strain gauge unit employed in an accelerometer.
Figure 6:
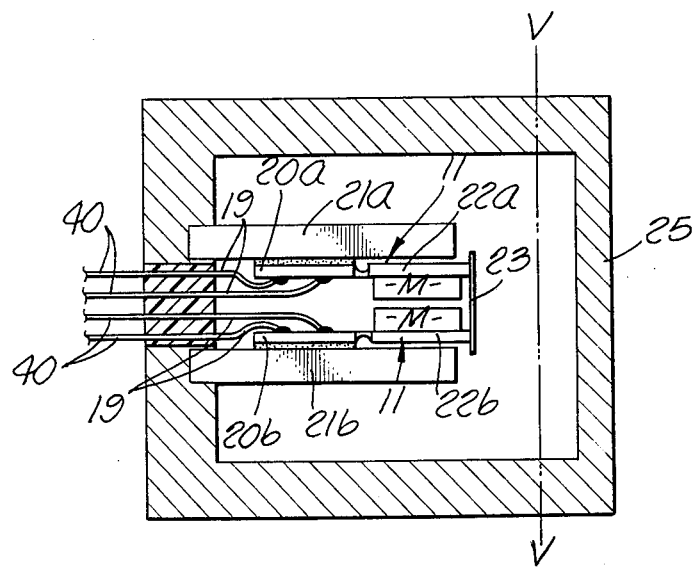
FIGS. 6 and 7 are elevational views of other accelerometers, each employing two strain gauge units.
Figure 7:
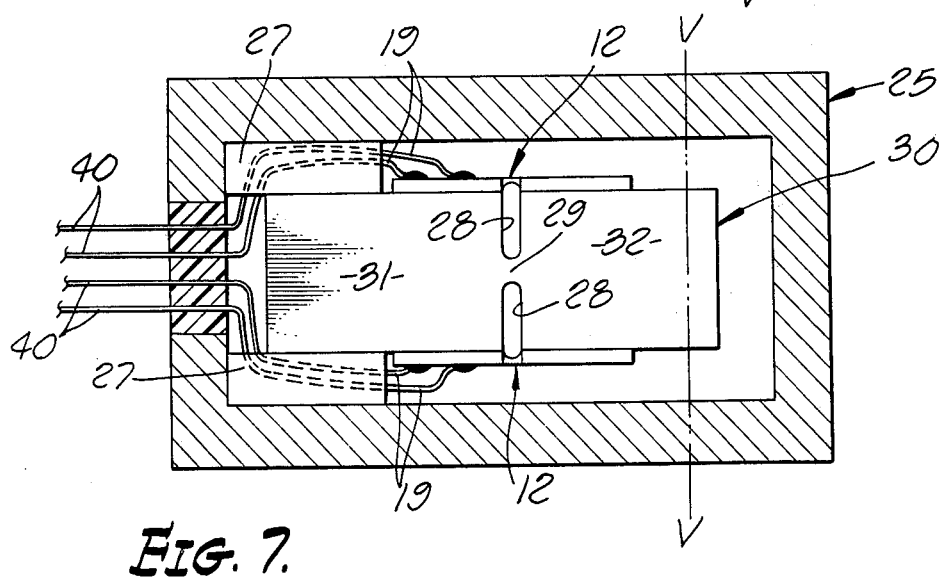

In the specific embodiments of the invention illustrated in FIGS. 1 and 2, the strain gauge unit 10 comprises a semiconductive substrate support body 11 in the form of a very small elongated block of piezoresistive semiconductive material having a reduced neck 12 separating two enlarged pads 13. Three accelerometers employing such strain gauge units 10 are illustrated in FIGS. 5, 6 and 7. When these accelerometers are subjected to acceleration, changes in resistance of the strain gauge unit 10 produced by tension, compression, or bending forces applied to unit 10 are measured to determine the magnitude of the physical phenomenon under investigation.

In the embodiments of the invention illustrated, the substrate support body 11 consists of a single crystal of N-type, semiconductive silicon material oriented with the [111] plane substantially perpendicular to the longitudinal axis Z-Z of the support body 11 or at least transverse.

An impurity, such as boron, is introduced into one face of the support body 11 across the neck 12, as by diffusion, in order to form a two-legged lineal resistor 14 of a conductivity type (P or N) other than the conductivity type (N or P) of the support body 11. The lineal resistor is created within the support body 11. The resistance of the resistor 14 is determined by such factors as the types of material and the extent of diffusion. The embodiments of the invention described herein employ boron as the doping material which forms a P-type resistor. Electrical terminals 18 are formed at the ends 17 of the resistor 14 as more fully described hereinafter.

The strain gauge unit 10 illustrated in FIG. 1 is substantially rectangular in overall shape, having an overall length L of approximately 0.1 in., overall width W of approximately 0.075 in., and a thickness H of approximately 0.0055 in. However, the element 10 is not limited to the particular dimensions set forth. The reduced neck 12 is formed by means of a pair of opposed notches 15 that lie on opposite sides of the neck 12 and by a third notch 16 on another side thereof. The notches 15 have semi-cylindrical surfaces at their inner ends. The radii of these surfaces are about 0.0035 in. The notches 15 are cut to a depth of about 0.034 l and notch 16 is cut to a depth of about 0.0035 in. As a result, the reduced neck 12 has a cross-sectional area at its smallest section of about 0.000014 in.[2]. The neck 12 is very nearly in the shape of an hour-glass cut in half along its longitudinal axis. The neck 12 is joined to the pads 13 by outwardly flared portions that connect the neck 12 to the pads 13 by means of smooth curves. The top of the neck 12 is in the same plane as one of the surfaces of the pads 13. This configuration of the neck 12 simplifies the process of masking the unit to prepare for diffusing of boron into desired areas of the unit.

In the best embodiment of the invention, the length of the neck 12 is less than the length which could result in buckling when the neck is subjected to axial compressive forces. An applicable ratio of length to minimum thickness of the neck depends in part upon the Young's modulus of the material, its yield strength, the exact shape of the strain gauge element, and also the manner in which the pads 13 are supported. This ratio may be 15 or higher for some materials. A ratio of 4 is safe for most semiconductive materials.

Various types of etching and doping processes may be used in forming strain gauge units and embodying this invention. Only one particular method of forming such a unit is described. The support body is formed of a blank which is initially of rectangular configuration. For convenience the term substrate support body is employed to refer to the support body in its various stages of construction. First, the silicon substrate support body is oxidized in a steam-argon atmosphere at approximately 1,000° C for 6 hours. The oxidized surfaces of the substrate support body are then coated with a photosensitive resist material such as KPR (Kodak Photo Resist). On top of the KPR layer is placed a photographically reduced transparency which contains an opaque image corresponding to the geometric design of the area to be etched or diffused. The KPR layer is exposed to ultraviolet radiation through the photograph transparency. The KPR polymerizes in the areas that are exposed to the ultraviolet radiation. The polymerized KPR image formed by the ultraviolet radiation on the support body and defined by the transparent areas of the transparency, is insoluble in the usual developing baths. The opaque areas of the transparency act as a first mask to prevent portions of the KPR from being exposed to ultraviolet light. These unexposed portions are then dissolved in a developing bath leaving behind a tough, chemically resistant image in relief on the surface of the oxidized silicon substrate support body. This image in reief acts as a clearly defined second mask for etching openings in the oxide layer.

A silicon support body 11, which has been oxidized as described above, is then coated with KPR and overlaid with a transparency having opaque sections where the grooves 15 and 16 are to be etched. After the support body 11 is exposed to ultraviolet light, the unpolymerized KPR is dissolved in a developing bath. Then an etching solution, such as a buffered HF solution is employed to etch the grooves 15 and 16 in the silicon oxide that is on the surface. Another etching solution consisting of five parts of nitric acid and three parts of hydrochloric acid volume, is used to shape the neck 12. The remaining KPR is then removed and a new silicon oxide layer is formed on the support body 11. A new KPR coat is applied over the silicon oxide on the side of the support body 11 into which the boron is to be diffused, that is, on the side of the support body 11 on which the flat side of the neck 12 occurs. A transparency is placed on this surface of the support body 11 with an opaque design of the mask through which boron is to be diffused. After exposure to ultraviolet light, the unexposed KPR is dissolved in a developing bath and silicon oxide is etched away in a buffered HF solution to expose bare silicon in the area into which the boron is to be diffused. Boron is then diffused into the silicon support body 11 over this area. In one boron diffusion process employed, the silicon substrate support body 11 is exposed to boron tribromide in an atmosphere of argon and 1% of oxygen at a temperature of about 1150° C forming a diffused pattern including the lineal resistor 14. The terminals 17 of the lineal resistor 14 are in the form of enlarged squares on one pad 13 in order to provide an area large enough to insure an adequate junction with electrical terminal contacts 18 which are formed in a subsequent step of the process. Typical dimensions of geometrical patterns of the doped area will be described hereinafter.

The resistance of the doped boron line depends upon the time and temperature of the diffusion process and the geometrical configuration of the resistor. For example, diffusion of boron into N-type silicon at a temperature of 1120° C for 20 minutes to produce a doped line 14 in the substrate support body 11 of the dimensions and shape described has a sheet resistivity of 10 ohms per square. The sheet resistivity of such a resistor is the resistance of a square portion of the resistor having a length equal to the width of the resistor. With this definition the total resistance of the resistor is equal to the sheet resistivity multiplied by the ratio of the length of the resistor to its width.

After the boron is diffused and the excess boron and silicon oxide are removed by further etching, the support body 11 is again oxidized in the steam-argon atmosphere. This reduces the concentration of the boron and redistributes the diffused boron slightly within the support body 11 and also forms a protective oxide coating over the outer surface of the strain gauge unit. This oxide coating is then dissolved away over square areas within the boundaries of the terminals 17.

Small squares 18 composed of aluminum or gold are then deposited in these open windows to complete the electrical terminals for the lineal resistor. These terminals 18 may be formed by photoresist methods and by evaporation. This leaves two remaining metal films of sufficient area to form electrical terminal contacts 18.

The entire unit 11 is then raised to a temperature near the melting point of the metal and silicon, to bond the terminals 18 intimately to the ends 17 of the resistor 14. Leads 19 are then soldered or otherwise ohmically bonded to the terminals 18 as indicated in FIGS. 5, 6 and 7.

In the embodiment of the invention illustrated in FIG. 1, the area into which boron is diffused is of a U-shape. This U-shape places a greater portion of the lineal resistor 14 on the neck 12 where the greatest strain occurs. The cross-arm S of the U-shaped line 14 is located on one pad 13 and the legs G of the U extend across the neck 12 and the enlarged ends 17 of the resistor are located on the other pad 13. The employment of a U shape doubles the length of the resistor that is subject to strain and also doubles the resistance of the resistor. By doubling the length of the resistor, the width may also be doubled for a given amount of resistance. This facilitates making a resistor with a high degree of precision. Alternatively, it permits one to increase the amount of doping and maintain the resistance at a given level. The U-shaped resistor 14 of this invention is also advantageous since the two terminals 18 lie on a single pad 13 and hence are very close to the same temperature, thereby substantially eliminating thermoelectric effects.

Figure 3:
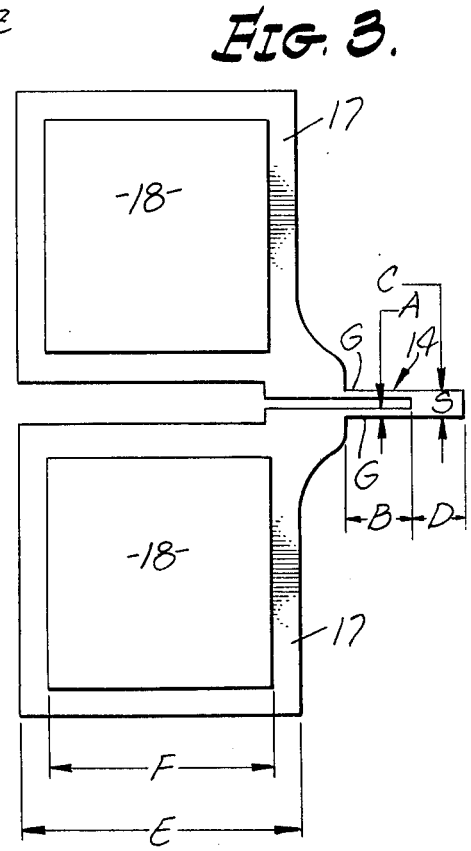
FIG. 3 is an enlarged plan view of a portion of one embodiment of this invention.

The relative dimensions of the U-shaped area and the contacts 18 are illustrated in FIG. 3. Each leg G of the U-shaped line has an overall width A of about 0.004 in. and an overall length B of about 0.009 in. The cross-arm of the U line has an overall width C of about 0.0014 in. and an overall length D of about 0.003 in. Each enlarged end 17 has four sides E of about 0.019 in. in length. The boron is diffused into the silicon along the line 14 to a depth of about 0.00016 in. Each terminal 18 has four sides F of about 0.015 in. in length. Each metal contact 18 deposited on the enlarged ends 17 has a depth of about 0.00008 in. The ratios of length to width of the cross-arm S and the ends 17 are very small compared with a like ratio for the legs C, so that their resistances are very low compared with that of the legs G. The thickness of the resistor 14 and the thickness of the end 17 are exaggerated in the figure for purposes of illustration.

Figure 4:
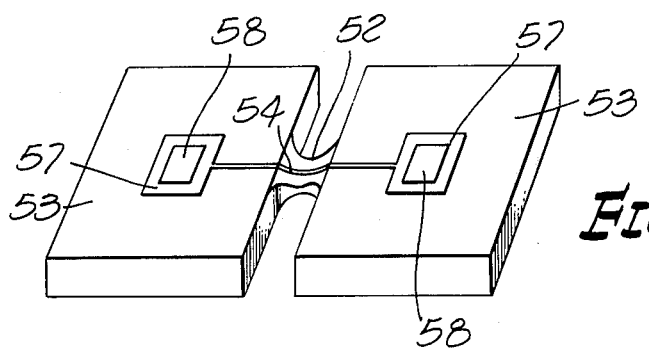
FIG. 4 is a perspective view of a strain gauge unit embodying this invention.

As is further illustrated in FIG. 4, strain gauge elements may be constructed in accordance with this invention having a reduced neck 52 of an hour-glass configuration in which all surfaces of the neck 52 are recessed from the surface planes of the pads 53. Such a configuration is described, for example, in Wilner U.S. Pat. No. 3,351,880. The unit of FIG. 4 is of the same configuration as the unit of FIG. 1 except for the fact that the neck is reduced on all four sides and the lineal resistor has its two terminals on different pads.

In this form of the invention, the lineal resistor is in the form of a single lineal member that extends across the neck 52 from one pad 53 to the other. Thus, a single doped line 54 is formed across the neck 52 from one pad 53 to the other with one metal terminal 58 on each pad 53 at the enlarged ends 57 of the line 54. In this unit the diffusion of boron may be accomplished by means of ionic implantation or by means of optical projection. These methods avoid the difficulties that would otherwise arise from applying masks to a curved surface of the neck.

When the strain gauge unit 10 is in use an electrical current flows into one terminal 18 through one leg G through the shunts, the other leg G and out from the other terminal 18. When the unit 10 is subjected to compression or tension forces in the direction of the axis Y-Y the neck 12 is strained by contraction or extension respectively. A corresponding change occurs in the resistance of the resistor 14. The change in voltage developed across the two terminals 17 of the doped line 14 is proportional to the current and to the change in resistance. The units illustrated are also suitable for use in detecting bending of the neck since the resistors 14 and 54 are displaced from the neutral plane about which bending would occur. The neutral plane passes near the center of the neck in both cases in a direction parallel to the broad surfaces of the pads 13 and 53.

Strain gauge units constructed in accordance with the embodiment of the invention illustrated in FIG. 1 may be employed to measure acceleration. Three accelerometers employing strain gauge elements have U-shaped resistors in accordance with this invention are illustrated in FIGS. 5, 6 and 7.

FIG. 5 illustrates a simple accelerometer making use of this invention. In this accelerometer, one pad 13 of a strain gauge element 10 is attached to an accelerating object B and a mass M is attached to the other pad 13.

As the object B undergoes oscillatory or other acceleration along the V—V axis, the neck 12 of the element 10 undergoes a bending or hinging motion. The resistor 14 on the upper surface of the element 10 is either compressed or extended depending on the motion of the mass M. As this compression or extension occurs during the bending action, the electrical resistance varies with the strain occurring in the neck 12. Such variations in resistance provide an indication of the acceleration.

FIG. 6 illustrates how two strain gauge elements may be mounted within the same accelerometer housing in order to increase the accuracy of measurement. In this accelerometer, pads 20a and 20b of support bodies 11 are secured, as by cement, to mounting blocks 21a and 21b. Masses M are mounted on pads 22a and 22b of strain gauge element 10. A tip strap 23, which serves to synchronize the vibrations of pads 22a and 22b, is secured to the outer ends of pads 22a and 22b. The strap 23 is rigid along its length but is flexible in a transverse direction. Pads 22a and 22b are spaced from the mounting blocks 21a and 21b in order to permit movement of these pads 22a and 22b relative to blocks 21a and 21b. The blocks 21a and 21b also act as stops for the strain gauge elements 10 so that they are not strained beyond their elastic limit. The tip strap 23 also serves to limit the motion of the strain gauge units towards the center, since the outward motion of the opposing member is restricted by its neighboring mounting block.

In this particular accelerometer, as the housing is subjected to acceleration along the V—V axis, the doped line 14 of the upper strain gauge element 10 is compressed when the doped line 14 of the lower strain gauge element 10 is extended, and vice versa. When the terminals 18 are connected to leads 40 and thereby placed in the arms of a Wheatstone bridge circuit having a power source and a voltmeter for detecting electrical variations, as is conventional, the decrease in resistance of one strain gauge unit and the increase in resistance of the other strain gauge unit provides a summed electrical signal which serves to increase the sensitivity with which acceleration is measured.

Another accelerometer employing this invention is illustrated in FIG. 7. In this accelerometer a block 30 is secured within a housing 25 by means of two support members 27. The block 30 is divided into two parts, by means of two opposing slots 28, a stationary member 31 rigidly connected to the housing 26 and a movable member or mass 32 which is hingedly supported from the stationary portion 31 of the narrow neck 29 lying between the slots 28. Two strain gauge units are supported on the block 30 with their respective necks 12 at the outer ends of the slots 28. One pad of each strain gauge element is secured to the stationary part 31 and the other is secured to the movable member or mass 32.

When the housing 30 is subjected to acceleration in the direction of the axis V—V, the mass 32 rotates about the hinge 29 causing the neck of one strain gauge unit to compress and the other to extend accordingly. In this case too, the strain gauge elements may be connected in a Wheatstone bridge circuit in order to provide signals that indicate the acceleration.

In the particular embodiments of the invention described in detail, a P-type lineal resistor is formed by diffusion of boron into the surface on one side of an N-type substrate. It will also be understood that other semiconductive materials such as gallium arsenide or germanium may be employed and that other doping materials of P-type, such as gold or copper or other metal in Group III of the periodic table, may be employed to form the resistor. It will also be understood that the substrate may be of P-type and the lineal resistor of N-type. In case the substrate support body is a P-type semiconductive material, doping materials of N-type, such as phosphorus, arsenic or antimony may be employed to form the resistor.

The strain gauge of this invention is characterized by high thermal coupling between the lineal resistor and the test body. Such high thermal coupling is brought about by the fact that the cross-section of the neck is large compared with the cross-section of the lineal resistor and the cross-section of each of the pads is large compared with the cross-section of the neck and the pads are bonded to a larger object. With this arrangement heat flows rapidly from the lineal resistor through the neck thence through the pads to the test object. This arrangement minimizes the rise in temperature. In the form of the invention in which a U-shaped resistor is employed, it also minimizes temperature differences between the terminals. As a result, any tendency of the terminals to generate electric voltages because of temperature differences are substantially eliminated.

In the best embodiment of the invention, the strain gauge unit is bonded to the intermediate supports 21a, 21b and 30 by means of cement that is of the electrical-insulating type so that the substrate may float electrically. This arrangement isolates the lineal resistor 14 and the substrate 11 electrically from the block or other object on which it is mounted. The flow of electricity from one point on the resistor to any other point on the resistor through the substrate is small. The current, in effect, tends to flow through a P-N junction in a forward direction at one point but in a reverse direction through a P-N junction at all other points, thus encountering a high resistance barrier at the latter points. As a result, the current is very very small, so that, in effect, the lineal resistor is electrically isolated from the substrate even when the voltage applied across the resistor exceeds the breakdown voltage of the P-N junction in the forward direction.

It will, of course, be understood that the invention is not limited to the exact construction described herein, but that the strain gauge unit may be embodied in many other forms and may be composed of other materials and may be incorporated in electromechanical transducers in other ways, all within the scope of the appended claims.

The invention claimed is:

1. In an electromechanical transducer unit:
    a substrate support body of semiconductive material having a first type of conductivity and having two pads separated by an intermediate reduced neck, and
    a lineal resistor in the reduced neck of the substrate support body said resistor being composed of semiconductive material having a second type of conductivity, the electrical resistance of the lineal resistor varying with the relative displacement of the pads of the substrate support body, and
    two relatively movable members secured to the respective pads for displacing one of the pads relative to the other.

2. An electromechanical transducer as defined in claim 1 wherein the depth and width of the lineal resistor are small fractions of the minimum thickness of the reduced neck.

3. An electromechanical transducer as defined in claim 1 wherein:
the substrate support body is reduced on all but one side at a position intermediate the two pads in order to form a neck which has one surface that is coplanar with the surfaces of the pads on one side of the substrate support body, and
the lineal resistor being in the side of the substrate support body which contains said surface.

4. An electromechanical transducer unit as defined in claim 1 wherein the substrate support body is reduced on all sides at a position intermediate the two pads in order to form a neck which has all of its surfaces recessed from all of the surface planes of the pads of the substrate support body.

5. An electromechanical transducer unit as defined in claim 1 wherein said resistor is provided with electrical terminals on said support body.

6. An electromechanical transducer unit as defined in claim 5 wherein said terminals are located on the same face of one of said pads.

7. An electromechanical transducer unit as defined in claim 1 wherein said support body is composed of a single crystal of silicon, said crystal having its [111] plane extending transversely of the longitudinal axis that passes through said pads and said neck.

8. An electromechanical transducer as defined in claim 1 wherein the transverse cross-section of the neck is larger than the cross-section of the resistor and the cross-sections of the pads are substantially greater than the cross-section of the neck, said pads being adapted to be bonded to an object undergoing test, whereby heat generated by the flow of electrical current through said resistor is conducted to said object through said neck and said pads.

9. An electromechanical transducer as defined in claim 1 wherein the first type of conductivity is N-type and the second type of conductivity is P-type.

10. In an electromechanical transducer unit;
a substrate support body of semiconductive material of a first type and having two pads separated by an intermediate reduced neck,
a lineal resistor composed of semiconductive material of a second type in the reduced neck of the substrate support body and extending from one of said pads to the other, one of said types being N-type, the other being P-type,
two metallic films on the substrate support body, each film contacting one of the ends of the lineal resistor respectively, the electrical resistance of the resistor varying with the relative displacement of the pads of the substrate support body, and
two relatively movable members secured to the respective pads for displacing one of the pads relative to the other.

11. A transducer as defined in claim 10 wherein said resistor is of U-shape and wherein said films are on the same face of the same pad.

12. In an electromechanical transducer:
a substrate support body of semiconductor material having a first type of conductivity and having two pads separated by an intermediate reduced neck,
a U-shaped line of semiconductive material of a second type of conductivity in one side of the substrate support body, one end of each leg of the U terminating on the same pad, the cross-member of the U being positioned on the other of said pads,
two metallic films on the same same pad, each respectively contacting the two ends of said legs on said same pad and adapted to be contacted by terminals, the electrical resistance of the resistor element formed by the terminals, the metallic films and the U-shaped line varying with the relative displacement of the pads of the substrate support body about the neck, and
two relatively movable members secured to the respective pads for displacing one of the pads relative to the other.

13. An electromechanical transducer as defined in claim 9 wherein:
the transverse cross-section of the lineal resistor is substantially smaller than the transverse cross-section of the neck and the transverse cross-section and the length of the pads are substantially greater than the transverse cross-section and the length respectively of the neck;
the first type of conductivity is N-type and the second type of conductivity is P-type;
the substrate support body is reduced on all but one side at a position intermediate the two pads in order to form a neck which has one surface that is coplanar with the surfaces of the pads on one side of the substrate support body, and
the lineal resistor is in the side of the substrate support body which contains said surfaces.

* * * * *